United States Patent Office 3,338,170
Patented Aug. 29, 1967

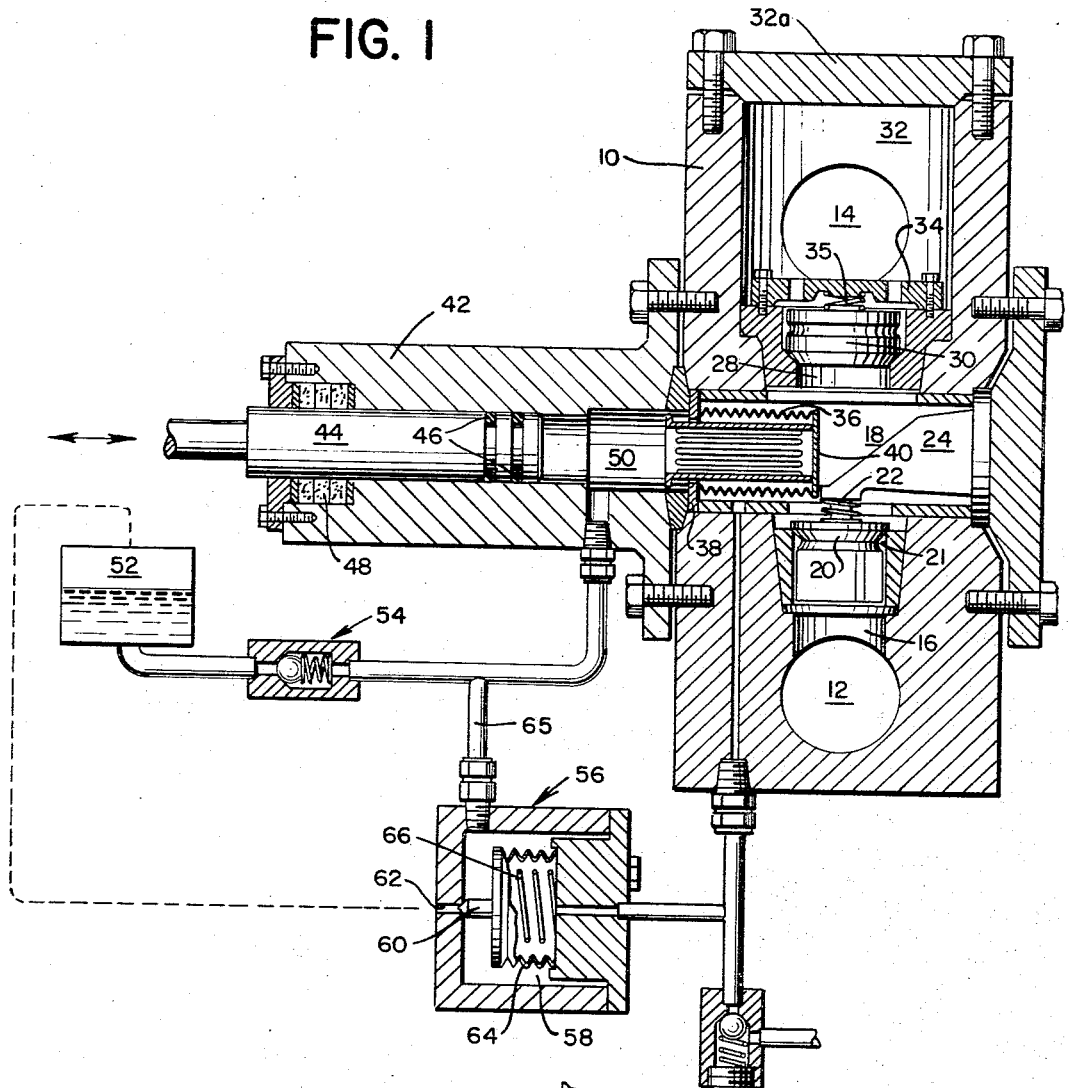

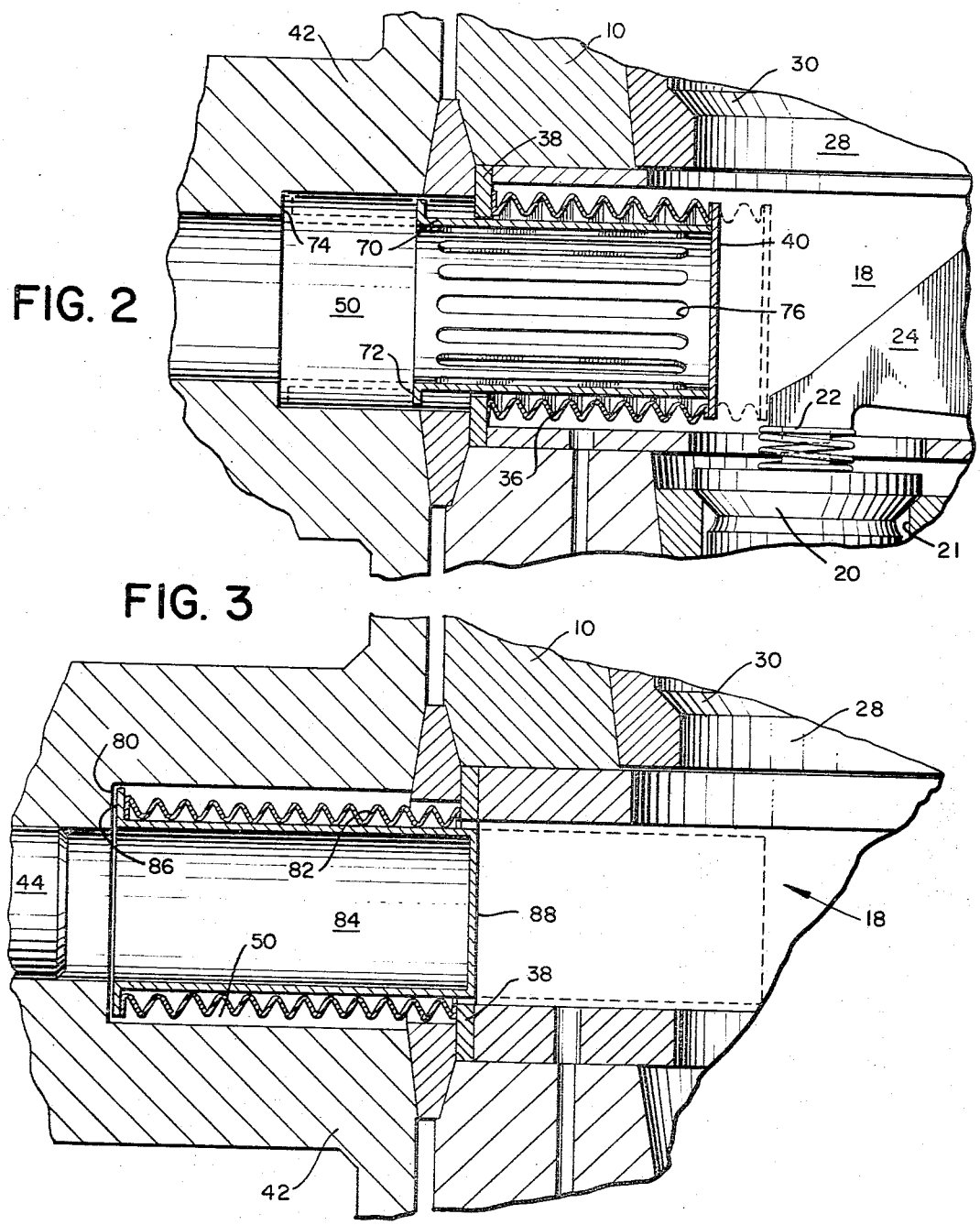

3,338,170
PUMPING DEVICE
Charles A. Swartz, 1 Bronxville Road, Apt. 6K,
Bronxville, N.Y. 10708
Filed Apr. 8, 1965, Ser. No. 446,552
5 Claims. (Cl. 103—148)

ABSTRACT OF THE DISCLOSURE

The present invention includes a positive displacement liquid pump having a cylindrical chamber within a housing containing a cylindrical bellows, a rigid end plate secured to the bellows, a cylindrical support member disposed within said bellows and having a plurality of spaced slots, a flanged member secured to the support member for limiting the maximum extension and contraction of the bellows, a reciprocable plunger for alternately raising and lowering the pressure of fluid on the inside of the bellows for effecting an alternate expansion of the bellows into a portion of the cylindrical chamber containing a fluid to be pumped, and fluid inlet and outlet means in communication with the cylindrical chamber.

---

This invention relates to positive displacement liquid pumps and more particularly to an improvement in those reciprocating pumps wherein the reciprocating member is separated from the liquid being pumped.

In Patent No. 3,151,562 there is shown and described a type of pump in which a flexible diaphragm or bellows is arranged to transmit pressure from a working fluid to the fluid being pumped. As the pressure on the fluid being pumped is substantially equal to the pressure of the fluid which is utilized to produce the pressure in the pumped fluid, the differential pressure across the bellows is relatively small. One difficulty with such an arrangement however is that there may be the possibility of unforeseen conditions which can result in the imposition of the entire discharge pressure on the bellows without a balancing pressure on the other side thereof, or a high differential pressure across the bellows wall. When this occurs the bellows may rupture, or be so badly distorted that it cannot be used further. Under these conditions it is necessary to resort to disassembly of the pump in order to replace the bellows.

It is a primary object of the present invention to provide a pump for the handling of noxious or dangerous liquids in which there is employed a bellows and a working liquid, with a mechanism for displacing the working liquid to cause motion of the bellows and a pumping action on the dangerous liquid.

It is a further object of the present invention to provide a positive support for the bellows of a pump of the type described operative upon loss of pressure on one side thereof to prevent rupture of the bellows.

It is a further object of the present invention to provide a pump for noxious or dangerous liquids of the type described in which a high differential pressure across the bellows wall does not result in rupture or undue distortion of the diaphragm used to separate the two liquids.

It is a further object of the present invention to have the bellows stroke in compression on the discharge stroke when desirable, or partly in compression and partly in expansion.

Further objects and advantages will become apparent as this description proceeds with reference to the attached drawings, in which:

FIG. 1 is a view in sectional elevation of a preferred form of pump embodying the present invention, with some parts shown schematically;

FIG. 2 is an enlarged showing of a portion of the device shown in FIG. 1;

FIG. 3 is a view, similar to FIG. 2, of a modified form of the present invention, in which the bellows is compressed on the discharge stroke; and FIG. 4 is a view of a still further modified form of the present invention.

Referring more particularly to FIG. 1 a surge block 10 is shown having an inlet 12 and an outlet 14 for the fluid being pumped. Fluid passes through the passage 16 to the pump chamber 18 on the suction stroke of the pump. Valve 20 may be held against its seat 21 by a spring 22, if required by the suction pressure of the fluid being pumped, said spring being held in place by a valve retainer 24. The member 24 may be integral with or secured to a member forming a cover for an opening in one wall of the pump chamber 18. Upon the working stroke of the pump, liquid is driven up passage 28 past the valve 30 into the space 32, whence it passes to the outlet 14. This valve 30 is held to its seat by means of a valve retainer 34 and the valve spring 35, or by a valve stop which can be an integral part of or secured to the valve chamber cover 32A.

From what has been said so far it can be seen that in order to make the pump act, it is necessary to change the effective volume of the pump chamber 18 as in an ordinary piston-type or reciprocating pump. In the shown form a metallic bellows 36 is provided. This bellows is secured at one end to a wall of the pump chamber 18, being welded or brazed to a ring 38 and having its other end similarly united with a plate 40. Secured to the wall of the surge block 10 there is provided a pump cylinder 42. Within the bore 50 of the pump cylinder 42 is mounted for reciprocation a plunger 44. For the purpose of maintaining the pressure developed by the plunger 44 during its working stroke one or more O-rings may be used as at 46. A suitable stuffing box 48 may also be employed to prevent or minimize leakage of the operating liquid. Assuming that bore 50 and the bellows 36 are completely full of liquid it can be seen that the change of volume of the chamber 18 can exactly duplicate the displacement of the plunger 44 within the bore 50 of the cylinder.

In order to maintain that space 50 full of liquid, a reservoir 52 is connected through a check valve 54 to the interior of the cylinder space 50 by means of the piping shown. The reservoir 52 is preferably maintained at a pressure greater than the suction pressure in surge block 10 in order that any leakage occurring past the packing 48 will be fluid outwardly rather than air inwardly, also so that, fluid will flow through the check valve 54 into the chamber 50 to replenish any loss of activating fluid.

It will be appreciated that it is possible to have an excess of fluid in the chamber 50 or an excess pressure in the surge block 10 which would have a disruptive effect upon the bellows 36. In order to balance the pressure on the opposite sides of the bellows a balancing valve 56 is provided. This valve comprises a chamber 58 divided into two parts by means of a bellows 64. One side of the bellows is in communication with the pump chamber 18 the other side is in communication with the interior of the pump cylinder 50. A needle valve 60 closes the port 62 when the pressure within bellows 64 exceeds the pressure outside of the bellows. That is, port 62 is normally closed unless the pressure within the pump chamber 18 is less than the pressure in chamber 50 by a specified amount depending upon the strength of the spring 66 which holds the needle 60 against its port. When, however, the pressure within the cylinder 50 rises appreciably over the pressure within the pump chamber 18 the port opens, thus allowing escape of fluid down the line 65 into the interior of the casing 58 and out through the port 62. This fluid may most conveniently be disposed of by leading the pipe to the reservoir 52.

If every part of the above described construction functioned exactly as described the bellows 36 would have substantially the same pressure within it as outside of it. However, failure of the valve 54 to seat properly or the needle 60 to properly close would result in a loss of fluid from within the cylinder 50 and the exertion of the full discharge pressure on the bellows without a corresponding presure on the inside of the bellows. Such might result in the rupture of the bellows and the escape of the fluid being pumped into the working parts of the cylinder 50 and perhaps into other parts of the mechanism.

It is for that reason that the structure shown in large scale in FIG. 2 is adopted. A tube 70 is provided which is secured by welding, brazing or the like to the plate 40, or may be integral therewith. This tube 70 is of such a size as to almost but not quite engage the valleys of the bellows 36. Preferably, for a reason that will be explained, the end of this tube opposite the ends secured to the plate 40 is provided with a flange 72 which may be integrally formed or secured as by brazing or the like. This tube may be made to closely fit the ring 38 and in order that it may be properly supported and not drag on the interior of the bellows 36. As shown in FIG. 2, the cylinder is counterbored forming a shoulder 74 and the tube 70 is preferably of a length to cause the flange 72 to engage the shoulder 74 when the bellows has been compressed, and to engage ring 38 when the bellows has been extended to such an extent that further compression or extension might result in damage to the bellows.

In order to assure that the pressure on the interior of the bellows is that obtained in the cylinder 50, the tube 70 may be provided with openings to permit free passage of liquid from the cylinder 50 to the interior surface of the bellows 36. In the form shown, openings 76 take the form of long slots. Any sufficient perforation of the cylinder 70 may be utilized, as, for instance, a series of circular holes. It will be understood, however, that whatever method of perforation is employed must be of a kind with relation to the thickness of the cylinder wall to leave enough residual strength in the cylinder 70 to support the bellows against the crushing pressure which may be generated through malfunction of the pump which results in imposition of an excess pressure on the exterior surface of the bellows. It is also to be understood that it is preferable that the counter boring referred to resulting in the shoulder 74 and the length of the cylinder 70 is such that when the flange 72 contacts the ring 38 upon rightmost movement of the plate 40 there is still a clearance between the plate 40 and the valve chamber filler 24. Such a construction obviously protects the bellows from distortion by striking against the filler 24 should the volume of fluid within the cylinder 50 become excessive for some reason or the other.

In FIG. 3 there is shown a modification of the device shown in FIG.2. In this form the pump as a whole is slightly modified so that the pressure of the fluid being pumped is exerted on the inside of the bellows rather than on the outside thereof. In this form the bellows is in compression on the discharge stroke, or partly in compression and partly in expansion, the greater part of the stroke being in compression. The cylinder 50 is counterbored at 80 to receive the bellows 82 when it is extended to its ful extent upon the suction stroke of the plunger 44. Within the bellows 82 there is provided a cylindrical body 84 having a flange 86 to which one end of the bellows is secured as by brazing or welding. The opposite end of the bellows is secured to the ring 38 as described in connection with FIG. 2. The cylindrical body 84 is preferably hollow although in theory it need not be. A wall 88 extends over the end of the body 84 which is not secured to the bellows. In this construction, upon a loss of pressure in the working fluid, the bellows will be supported by the counterbored section of the interior of the cylinder 50 and thus prevented from bursting. It will be understood further that the form shown in FIG. 3 cannot have perforations as does that in FIG. 2 and the fluid between the interior of the bellows and the exterior of the body 84 is maintained in a correct amount by axial flow of fluid between the bellows and the hollow body 84. This flow is rather small, consisting as it does of the mere displacement of the fluid between these two surfaces as the bellows is compressed. The pressure on the outside of the bellows is the pressure of the working fluid.

In FIG. 4 there is shown a further modification of the device shown in the other figures. In this form of device, the driven plunger 100 has integrally secured to its inner or working end a cylindrical body 101 extending into the chamber 102, for movement therewith. A bellows 103 is provided at one end with a suitable flange 104 welded or otherwise secured thereto, which is held between the plunger cylinder body 105 and the block extension 106 by bolts 107 to establish a seal between the interior of the bellows and the exterior thereof. A similar flange 108 secured to the other end of the bellows 103 is secured to the cylindrical body 101 by the displacement member 109 screwed down on the threaded extension 110 in the manner of a nut. Ports 111 and 112 are provided as in the form shown in FIG. 1 for similar purposes.

The internal cylindrical body 101 is made as large as possible to provide the support against crushing of the bellows from excessive external pressure thereon, and, if desired, may be grooved at intervals to permit ready passage of the relatively small amount of working liquid between the interior of the bellows and the surface of supporting body 101 as the pump plunger reciprocates.

It will be understood that various modifications of the shown device may be made without the exercise of the invention over the device as set forth in the following claims.

What I claim is:

1. In fluid displacement apparatus, a housing having an elongated cylindrical chamber formed therein; bellows means secured to said housing for dividing said chamber into a first portion for containing a fluid on one side of said bellows means and into a second portion for containing a fluid to be pumped, said first portion having walls defining a counterbored compartment with a shoulder, said bellows means including a substantially cylindrical bellows and a rigid end plate secured to said bellows; a plunger reciprocably disposed in a portion of said compartment for alternately raising and lowering the pressure of the fluid therein and effecting a corresponding alternate extension of the bellows means into and out of said second portion; fluid inlet and outlet means in communication with said second portion for passage of the fluid to be pumped therethrough; a ring member secured to said bellows and disposed at an end of said counterbored compartment, said ring member having a bearing surface; and means for supporting the walls of said bellows, comprising a substantially cylindrical member having a portion thereof disposed within said walls and having a plurality of openings formed therethrough, said cylindrical member being integral with said end plate, and flange means integral with said cylindrical member for limiting the maximum extension and contraction of said bellows, said flange means engaging said shoulder upon the differential pressure between the fluid in said first portion and the fluid in said second portion reaching a first predetermined value as a result of the movement of said plunger, said flange means engaging said bearing surface upon said differential pressure reaching a second predetermined value.

2. In fluid displacement apparatus according to claim 1, further comprising pressure limiting means responsive to said differential pressure, said pressure limiting means including a casing, an auxiliary bellows secured at one end thereof within said casing and dividing it into a first part and a second part, the first part being in fluid communication with said chamber first portion, the second part being in fluid communication with said chamber second portion, a rigid closure plate attached to the other end of said auxiliary bellows, said first part including an aperture in the wall of said casing opposite said closure plate for venting motivating liquid from the first part, said closure plate including plug means in line with the aperture for controlling venting of said first part through said aperture, and spring means for normally biasing said closure plate and the plug means thereon to seal the aperture, whereby upon an increase in the pressure of motivating fluid in the first portion beyond a predetermined differential with the pressure in the second portion the plug means operates to vent excess motivating fluid through the aperture until a predetermined maximum value of differential pressure between said first and second portions is restored.

3. In fluid displacement apparatus according to claim 1, wherein said openings comprise spaced slots having longitudinal axes parallel with respect to the longitudinal axis of said cylindrical member.

4. In fluid displacement apparatus according to claim 1, wherein said openings comprise spaced elliptical holes.

5. In fluid displacement apparatus, a housing having an elongated chamber formed therein, said chamber having walls defining a counterbored compartment with a shoulder; bellows means within said chamber for dividing said chamber into a first portion for containing a fluid on one side of said bellows means and into a second portion for containing a fluid to be pumped, said first portion including said counterbored compartment, said bellows means including a substantially cylindrical bellows having a rigid end plate integral therewith; a plunger reciprocably disposed in a portion of said compartment for alternately raising and lowering the pressure of the fluid therein and effecting a corresponding alternate extension of the bellows means into and out of said second portion; fluid inlet and outlet means in communication with said second portion for passage of the fluid to be pumped therethrough; a ring member secured to said bellows and disposed at an end of said counterbored compartment; and means for supporting the walls of said bellows, comprising a substantially cylindrical member having a portion thereof disposed within said walls, and flange means integral with said cylindrical member for limiting the maximum extension of said bellows, said flange means engaging said shoulder upon the differential pressure between the fluid in said first portion and the fluid in said second portion reaching a predetermined value as a result of the movement of said plunger, said flange means secured to said bellows.

References Cited
UNITED STATES PATENTS

| | | | |
|---|---|---|---|
| 49,410 | 8/1865 | Huss | 230—160 |
| 293,461 | 2/1884 | Hemenway | 103—148 |
| 1,436,443 | 11/1922 | Holmes | 230—160 |
| 1,675,829 | 7/1928 | Smith | 103—148 |
| 2,076,732 | 4/1937 | Kuehne | 103—148 |
| 3,151,562 | 10/1964 | Swartz | 103—148 |

DONLEY J. STOCKING, *Primary Examiner.*

WILBUR J. GOODLIN, *Examiner.*